March 8, 1960 YAO T. LI 2,927,462
ORIFICE TYPE FLOWMETER
Filed Oct. 28, 1955 2 Sheets-Sheet 1

INVENTOR.
YAO T. LI
BY *Kenway Jenney*
*Witter Hildreth*
ATTORNEYS

March 8, 1960 YAO T. LI 2,927,462
ORIFICE TYPE FLOWMETER
Filed Oct. 28, 1955 2 Sheets-Sheet 2

INVENTOR.
YAO T. LI
BY
ATTORNEYS

United States Patent Office 2,927,462
Patented Mar. 8, 1960

2,927,462

ORIFICE TYPE FLOWMETER

Yao T. Li, Watertown, Mass.

Application October 28, 1955, Serial No. 543,568

3 Claims. (Cl. 73—228)

The present invention relates to flowmeters and more particularly to head-type flowmeters for measuring flows under pulsating conditions.

The usual head-type meter utilizes a differential pressure gage connected into the pipe at opposite sides of an orifice plate. Under steady flow conditions meters of this type give fairly accurate results. Under pulsating flow conditions, however, such a meter is subject to serious dynamic errors.

One of the dynamic errors arises from the fact that the differential gage measures pressure. The instantaneous flow rate is proportional to the square root of the pressure. Hence the average reading of the gage gives a root-mean-square flow rather than a true average flow.

In order to obtain a measurement of average flow, which is the desired measurement because of the fact that it indicates total quantity of fluid, it has been proposed to take the square root of the instantaneous values of pressure and then to average the square roots. This has not been accomplished with differential gages of the usual type because these have ordinarily been constructed to have a low natural frequency with a considerable amount of damping in order that steady direct reading indications may be obtained. Such a system filters the high frequency terms and hence renders it ineffective to give instantaneous square rooting. For accurate square rooting under pulsating conditions it is essential to use a gage having a high natural frequency.

However, a high natural frequency introduces another and more difficult problem, namely, the effect of what may be termed the "virtual mass." The virtual mass is a quantity which is determined by the conduit geometry and which contributes to an error in pressure due to the acceleration of fluid along a streamline between two points on opposite sides of the orifice plate. The concept of virtual mass will be explained in more detail later, but it may be noted here that it is a quantity which has the dimensions of density times length and is not directly comparable to ordinary mass, but rather to mass per unit area, because when multiplied by acceleration it gives pressure rather than force. Furthermore, the points between which the virtual mass is measured are not necessarily the tap points of the pressure gage, but rather depend on the velocity potentials which may be considered to exist in the flow pattern. In any event, the virtual mass contributes a dynamic error which may be shown to be particularly large if the pressure measuring system has a high natural frequency response. Of critical importance is the factor $$\frac{M_v}{S}$$

where $M_v$ is the virtual mass and $S$ is the sensitivity of of the measuring system. For small errors this factor should be maintained as small as possible.

It is the principal object of the present invention to provide an accurate head-type flowmeter capable of measuring pulsating flows with greater accuracy than has heretofore been achieved.

With this end in view one of the principal features of the invention is the diminution of he virtual mass or at least the critical factor $$\frac{M_v}{S}$$

as will be explained in further detail in the subsequent description.

Another feature of the invention comprises a function-generating circuit (usually in the form of a square rooting circuit) to reduce the values of instantaneous pressure to instantaneous velocity which may then be averaged to give the average flow rate.

In the accompanying drawings Fig. 1 is a diagram to illustrate the principle of virtual mass;

Figure 1:
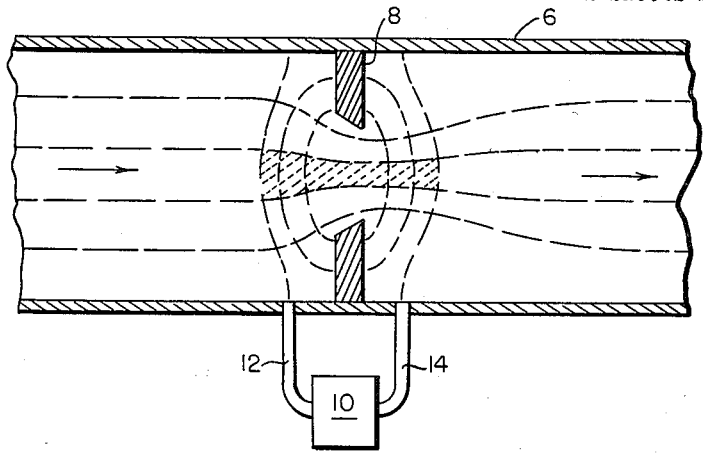

To illustrate the concept of virtual mass I show in Fig. 1 a conduit 6 having an orifice plate 8 with a single central orifice, a differential pressure gage 10, and upstream and downstream taps 12 and 14 leading from the conduit on opposite sides of the orifice plate to the differential gage. A stream line and potential map is also indicated in the drawing. The map is drawn on the assumption that true potential flow exists, with the understanding that that is an idealized condition which, while it does not completely represent the conditions in the conduit, nevertheless is helpful in developing a theoretical treatment.

The concept of virtual mass arises from the integration of one of the terms of the conventional equation of motion of the fluid, which is:

$$wu\frac{\partial u}{\partial x}+w\frac{\partial u}{\partial t}=\frac{\partial p}{\partial x}$$

where $w$ is the density of the fluid, $u$ is the flow velocity, $p$ is the pressure difference, and $x$ represents distance along a flow line. Integration of the second term with respect to $x$ gives an error pressure, which can be considered as the product of virtual mass by acceleration, since it represents the pressure difference required to accelerate the liquid between the two points.

For the case of uniform flow pattern, the virtual mass between two points is simply $wx$. When the flow pattern is not uniform, the virtual mass depends on the geometry of the potential map. Thus, the virtual mass between the two tap connections in Fig. 1 is represented by the length of path between the two equipotential surfaces which correspond to the tap connections. In other words, the virtual mass is determined by the actual length between the equipotential surfaces at the center, which length is represented by the shaded portion in the drawing. For purposes of this description, it suffices to state that the virtual mass is approximately $wx$, as in the case of uniform flow, where $x$ is the length of the shaded path between the equipotential surfaces under consideration.

Since the measurement is concerned with the determination of pressure differences, the virtual mass is a quantity such that when multiplied by acceleration gives pressure rather than force, and hence it is the length of the path that is important, and not the total volume or actual mass of the fluid between the equipotential surfaces. This distinction is of importance because it will be seen that the smaller the orifice, the less will be the length of the path and hence the less will be the virtual mass. It is desirable that the virtual mass be as small as possible, since the dynamic error in the pressure reading is proportional to the virtual mass.

Figure 2:
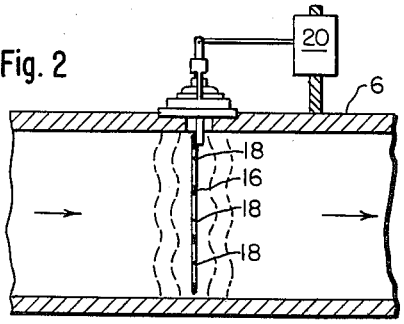
Figs. 2 and 3 are sectional side and end views of a conduit utilizing one form of the invention.
Figure 3:
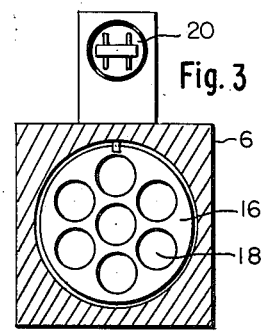

In Figs. 2 and 3 I show a conduit 6 with an orifice plate 16 having a number of orifices 18. It can be shown that the pressure sensitivity S of an orifice plate is substantially proportional to the ratio of the area of the conduit to the total orifice area and is independent of the distribution of the area. Hence the sensitivity of an orifice plate having a number of holes is substantially the same as the sensitivity of a plate having a single hole of the same area. However, the virtual mass $M_v$ is a function of the streamline pattern through any single orifice and hence is the same for a number of small holes as it is for a single hole. These considerations lead to the conclusion that for a given conduit size and flow sensitivity, the virtual mass $M_v$ can be reduced by increasing the number of holes. In such a case the velocity potential pattern may be considered to be of the nature of that shown in Fig. 2, because the equipotential surfaces do not bow out from the plate to the same extend as in Fig. 1 where a single large orifice is used.

Instead of introducing pressure taps into the conduit at opposite sides of the orifice plate, I prefer to use motions or distortions of the plate itself to effect the measurement. The plate is sensitive to differential pressures on its opposite sides. If made sufficiently thin it will result in a virtual mass of extremely small magnitude. The critical factor of merit $$\frac{M_v}{S}$$

will therefore be reduced to negligible proportions.

The orifice plate 16 of Figs. 2 and 3 may be hinged in a manner to permit it to swing slightly to respond to pressure differences. The motions of the plate are transmitted through a seal to a force-sensing transducer 20, preferably of the type shown in my Patent No. 2,781,665, dated February 19, 1957. Since the plate may be made of small mass, the system is inherently one of high natural frequency and it is therefore essential that the virtual mass be reduced in order to limit the dynamic error.

Figure 4:
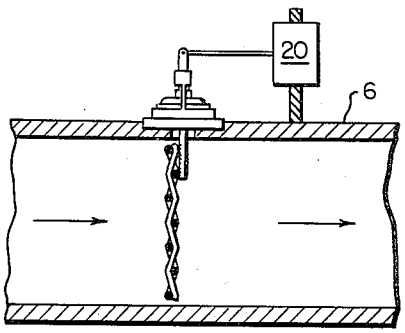
Figs. 4 and 5 are sectional elevations of conduits utilizing modified forms of the invention.
Figure 5:
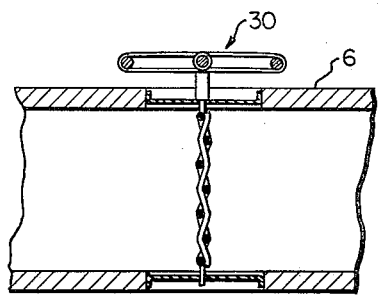

In the preferred form, the orifice plate has a large number of small orifices, preferably in the form of a screen or net as shown in Fig. 4. It is not necessary that the plate be hinged. Flexure of the plate may be used to indicate instantaneous pressure. To this end opposite points of the plate may be connected as shown in Fig. 5 through diaphragm seals in the conduit so that flexure of the plate will result in stressing of the strain gage 30.

Figure 6:
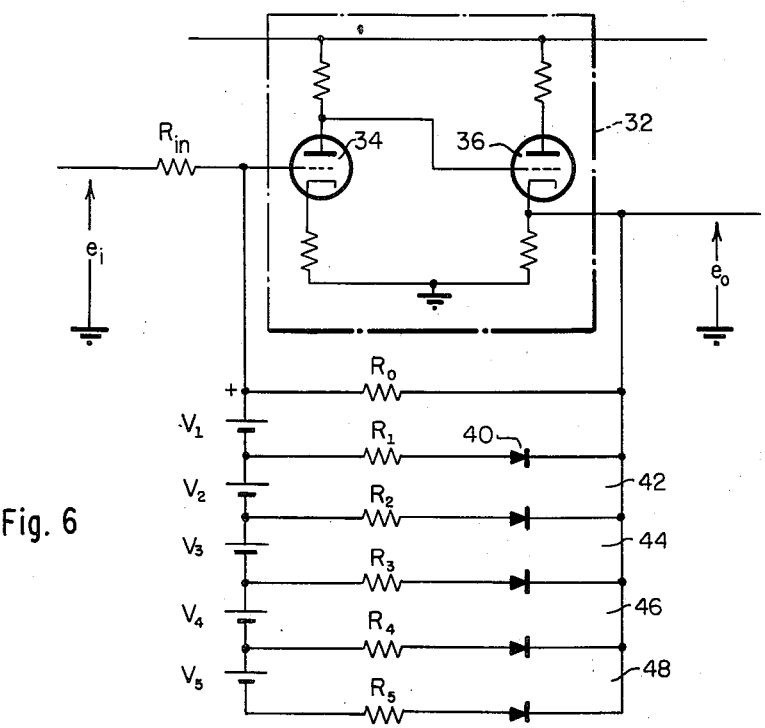
Fig. 6 is a diagram of an electrical circuit for the invention.

The output of the device of Fig. 2 or that of Fig. 4 is an electrical output. The electrical output is a function of the pressure, and assuming linearity of the orifice plate and strain gages the output is proportional to the pressure. It is desirable to read direct in velocity, which requires that the output be square rooted. (It will be understood that if mass flow is desired the velocity will be multiplied by the density.) In Fig. 6, I show a function generating circuit which may be used for square rooting, or in fact for generation of functions other than the square root. The circuit comprises an amplifier 32 as indicated by the parts enclosed in dash lines. The amplifier 32 includes an inverter tube 34 and an amplifier tube 36 connected in conventional fashion. The input from the strain gages is introduced to the tube 34 through a resistance $R_{in}$. A resistance $R_0$ is connected from the grid of tube 34 to the cathode of tube 36. Assuming that the instantaneous input voltage is $e_1$, the output potential will be $e_0$ where the voltage is connected by the following relation.

$$\frac{e_0}{e_1} = \frac{G}{1+\frac{R_{in}G}{R_0}} = \frac{R_0}{R_{in}} \text{ (approx)}$$

where G is the gain of the amplifier and is assumed to be large enough so that the approximation is correct within the limits of accuracy of the equipment.

In parallel with the resistance $R_0$ is a ladder type network. The first branch of the network comprises a shunting circuit including a battery 38, a resistance $R_1$ and a rectifier 40. A second shunting circuit 42 is connected in parallel with the first shunting circuit, and additional shunting circuits 44, 46 and 48, all of identical form, are arranged to form the ladder network. The batteries have the voltages designated $V_1$, $V_2$, etc.

Figure 7:
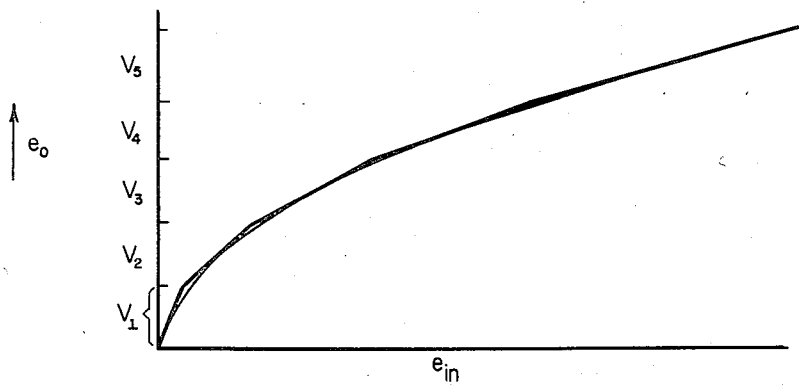
Fig. 7 is a graph to illustrate the characteristics of Fig. 6.

So long as the instantaneous value of $e_1$ is lower than the voltage $V_1$ no current will flow in any of the shunting circuits, and the relation between the output and input voltages is given in the above equation. However, when the instantaneous value of $e_1$ rises above the value of $V_1$ current will flow through the resistor $R_1$ and this has the effect of putting $R_1$ in parallel to $R_0$, thereby diminishing the output voltage. The relation between $e_0$ and $e_1$ is then given by Fig. 7 which shows that at each step represented by the battery voltages the graph changes its slope. By suitable adjustment of the values of the battery voltages and the shunting resistors the function generator may be arranged to give any desired output. Preferably in the case described herein, the output voltage may be made proportional to the square root of the input voltage, or nearly so since a square root curve may be sufficiently well fitted to the linear segments shown in Fig. 7.

It will be understood that because of possible non-linearities in the system the indicated pressure may not be exactly proportional to the actual pressure, and hence the velocity will not be exactly the square root of the indicated pressure. In such cases the calibration may be effected in such a manner that the graph of Fig. 7 departs from a true square-root graph to such an extent as to compensate for non-linear characteristics of the system. It will also be understood that any desired number of shunt circuits may be used in Fig. 6. In any case, the smaller the values of the battery voltages and the larger the values of the shunting resistances, the less will be the steps of the linear segments in Fig. 7. For a rough approximation a few shunting circuits with relatively long steps may be used while for better approximations a large number of segments will be preferred.

Total flow may be measured by integrating the voltage $e_0$ by any suitable means, as will be apparent to those skilled in the art.

Having thus described the invention, I claim:

1. A flowmeter for dynamic measurement of flow in a conduit, particularly under pulsating conditions, comprising a thin plate-like member extending across substantially the entire cross-section of the conduit and provided uniformly over its entire surface with a number of closely-spaced parallel passages through which the fluid passes, pressure-responsive means for measuring the instantaneous difference of pressure between closely-spaced points on opposite sides of the member, whereby said means is responsive to pulsations in pressure without appreciable error due to the virtual mass of the fluid between said points, said means comprising the member itself and a mounting therefor to permit motion of the member upon occurrence of a pressure difference between opposite sides thereof, and indicating means operated by the pressure-responsive means.

2. A flowmeter for dynamic measurement of flow in a conduit, particularly under pulsating conditions, comprising a thin plate-like member extending across substantially the entire cross-section of the conduit and provided uniformly over its entire surface with a number of closely-spaced parallel passages through which the fluid passes, pressure-responsive means for measuring the instantaneous difference of pressure between closely-spaced points on opposite sides of the member, whereby said means is responsive to pulsations in pressure without appreciable error due to the virtual mass of the fluid between said points, said means comprising the member itself and a hinge mounting therefor to permit it to swing upon occurrence of a pressure between opposite sides of the member.

3. A flowmeter for dynamic measurement of fluid flow through a conduit under pulsating conditions comprising a thin plate-like member extending across substantially the entire conduit and provided uniformly over its entire surface with a large number of openings for parallel flow of fluid therethrough, pressure-responsive means for measuring the instantaneous difference of pressure between closely-spaced points on opposite sides of the member, whereby said means is responsive to pulsations in pressure without appreciable error due to the virtual mass of the fluid between said points, said means comprising the member itself and a mounting therefor to permit motion of the member upon occurrence of a pressure difference between opposite sides thereof, and indicating means operated by the pressure-responsive means.

References Cited in the file of this patent

UNITED STATES PATENTS

| | | |
|---|---|---|
| 1,814,235 | Trogner | July 14, 1931 |
| 1,883,813 | Morrison | Oct. 18, 1932 |
| 2,687,645 | Velten et al. | Aug. 31, 1954 |
| 2,760,371 | Borden | Aug. 28, 1956 |

FOREIGN PATENTS

| | | |
|---|---|---|
| 251,194 | Great Britain | Apr. 29, 1926 |
| 644,105 | Germany | Apr. 24, 1937 |
| 520,083 | Great Britain | Apr. 15, 1940 |